United States Patent [19]
Nakanishi et al.

[11] Patent Number: 4,808,378
[45] Date of Patent: Feb. 28, 1989

[54] BLOOD OXYGENATOR

[75] Inventors: Hikaru Nakanishi, Kawasaki; Masahiro Kamiya, Bunkyo; Katsuyuki Kuwana, Yokohama; Hiroaki Ishizuka, Kasukabe, all of Japan

[73] Assignee: Senko Medical Instrument Mfg. Co., Ltd., Japan

[21] Appl. No.: 37,117

[22] Filed: Apr. 10, 1987

Related U.S. Application Data

[63] Continuation of Ser. No. 797,825, Nov. 14, 1985, abandoned.

[51] Int. Cl.$^4$ ............................................. A61M 1/14
[52] U.S. Cl. .............................. 422/48; 261/DIG. 28; 128/DIG. 3
[58] Field of Search ................. 422/45, 48; 210/321.4; 261/DIG. 28; 128/DIG. 3

[56] References Cited

U.S. PATENT DOCUMENTS

| | | | |
|---|---|---|---|
| 3,333,583 | 8/1967 | Bodell | 210/321.4 X |
| 3,422,008 | 1/1969 | McLain | 210/321.5 X |
| 3,505,686 | 4/1970 | Bodell | 422/48 X |
| 3,536,611 | 10/1970 | De Filippi et al. | 210/321.1 X |
| 3,794,468 | 2/1974 | Leonard | 422/48 |
| 3,893,926 | 7/1975 | Awad | 128/DIG. 3 X |
| 4,352,736 | 10/1982 | Ukai et al. | 210/323.2 X |

Primary Examiner—Barry S. Richman
Assistant Examiner—Lynn Kummert
Attorney, Agent, or Firm—Darby & Darby

[57] ABSTRACT

A blood oxygenator includes an elongated hollow housing having an elongated chamber therein, an elongated fiber assembly disposed within the chamber along an axis thereof and including a bundle of hollow fibers of a microporous membrane. The opposite ends of the fiber bundle are sealingly secured to the inner peripheral surface of the housing by a potting material. Gas inlet and outlet members are connected respectively to the opposite ends of the housing and communicate respectively with the opposite ends of the hollow fibers. Blood inlet and outlet are formed on the housing and communicate with the chamber intermediate the opposite ends of the hollow fibers. The fiber assembly includes a plurality of layers of spirally-wound fiber bundles arranged one upon another. Each turn of one of each adjacent spirally-wound bundles is disposed in a plane intersecting the plane in which each turn of the other fiber bundle is disposed. The outer periphery of the outermost layer of the spirally-wound bundle is held in contact with the inner peripheral surface of the housing.

10 Claims, 6 Drawing Sheets

U.S. Patent  Feb. 28, 1989  Sheet 1 of 6  4,808,378

BLOOD OXYGENATOR

This is a continuation of application Ser. No. 797,825, filed Nov. 14, 1985, now abandoned.

BACKGROUND OF THE INVENTION

1. Field of the Invention

This invention relates to a blood oxygenator or artificial lung of the type comprising a bundle of hollow fibers for oxygenating blood through gas exchange.

2. Prior Art

One conventional artificial lung or oxygenator 50 shown in FIGS. 1 and 2 comprises a tubular housing 52 of a synthetic resin having upper and lower end portions 54a and 54b of an enlarged diameter, and a bundle 56 of hollow fibers 57 disposed within the tubular housing 52. Each of the hollow fibers 57 is made of a microporous, gas permeable material such as a polycarbonate membrane, a porous polypropylene membrane, a porous polyethylene membrane, a regenerated cellulose membrane, a polysulfone, a porous nylon membrane, a porous polyester membrane, a porous acryl membrane or a porous fluorine plastics membrane. Each hollow fiber 57 has an inner diameter of 30 to 1000 $\mu$m. The upper end portion 54a has a blood inlet 58 for introducing blood into the housing 52 while the lower end portion 54b has a blood outlet 60 for discharging the blood from the housing 52. A pair of end caps or closure members 62 and 64 are attached to the upper and lower ends of the housing 52, respectively, the end cap 62 having a gas inlet 66 for introducing gas into the housing 52 while the other end cap 64 has a gas outlet 68 for discharging the gas from the housing 52. The opposite ends of the hollow fibers 57 of the bundle 56 are secured to the upper and lower end portions 54a and 54b, respectively, by fastening elements 70a and 70b of a potting resin such as a polyurethane resin and a silicone resin. A pair of seal ring 71a and 71b are carried by the caps 62 and 64, respectively, and are held in sealing engagement with the fastening elements 70a and 70b, respectively. A pair of peripheral retainer flanges 72a and 72b are formed on the inner surface of the housing 52, and a tube 74 of a flexible membrane with a thickness of 0.03 to 1.9 mm such as silicone rubber and latex rubber is disposed within the housing, and the opposite ends of the tube 74 are turned outwardly on the outer surfaces of the flanges 72a and 72b. The turned ends of the tube 74 are sealingly secured to the flanges 72a and 72b by a suitable adhesive. A port 76 is formed on the housing 52 and communicates into the interior of the housing 52 between the upper and lower flanges 72a and 72b, the port 76 being connectable to a fluid source such as a compressor for supplying fluid such as air to the interior of the housing 52 via the port 76. With this construction, upon application of the fluid to the interior of the housing 52 via the port 76, the flexible tube 74 is urged radially inwardly to provide a chamber 78 defined by the outer peripheral surface of the tube 74 and the inner peripheral surface of the housing 52.

In operation, an oxygenating gas, such as oxygen, a mixture of oxygen and air and a mixture of oxygen and carbon dioxide, is introduced into the end cap 62 via the gas inlet 66 and caused to pass through the internal bores of the hollow fibers 57 of the bundle 56, the gas being discharged from the end cap 64 via the gas outlet 68. And, blood is introduced into the housing 52 via the blood inlet 58 and is caused to pass along the hollow fibers 57 toward the blood outlet 60. At this time, the oxygen in the oxygenating gas flowing through the hollow fibers diffuses through the porous walls thereof and is brought into contact with the blood to oxygenate it while carbon dioxide in the blood passes through the walls of the hollow fibers thereinto. Thus, the oxygenating of the blood is achieved by such gas exchange as is well known in the art.

When the oxygenating gas and the blood are applied to the oxygenator 50, the hollow fibers 57 of the bundle 56 tend to be displaced toward the axis of the bundle 56. As a result, the outer periphery of the bundle 56 is spaced considerably from the inner peripheral surface of the housing 52, so that most of the blood introduced into the housing 52 passes through a space defined between the outer periphery of the bundle 56 and the inner peripheral surface of the housing 52. Therefore, the blood is not adequately oxygenated. To overcome this difficulty, the fluid under pressure is introduced into the housing 52 via the port 76 to flex the tube 74 radially inwardly toward the outer periphery of the bundle 56 to provide the chamber 78, so that the blood passes through the spaces between the hollow fibers 57 to enhance the oxygenating of the blood. However, this conventional oxygenator or artificial lung 50 is rather expensive to manufacture since the chamber 78 must be provided to achieve a desired oxygenating of the blood.

SUMMARY OF THE INVENTION

It is therefore an object of this invention to provide a blood oxygenator or artificial lung which is less complicated in construction and hence less expensive to manufacture without sacrifice of the oxygenating efficiency.

According to the present invention, there is provided a blood oxygenator comprising an elongated hollow housing having an inner peripheral surface defining an elongated chamber; an elongated fiber assembly disposed within said chamber along an axis thereof and comprising a bundle of hollow fibers of a microporous membrane, the opposite ends of said fiber bundle being sealingly secured to the inner peripheral surface of said housing by a potting material; gas inlet and outlet means connected respectively to the opposite ends of said housing and communicating respectively with the opposite ends of said hollow fibers so that an oxygenating gas can flow from said gas inlet means to said gas outlet means through the interiors of said hollow fibers; and blood inlet and outlet means formed on said housing and communicating with said chamber intermediate the opposite ends of said hollow fibers so that blood can flow from said blood inlet to said blood outlet through said chamber; the fiber assembly comprises a plurality of layers of spirally-wound fiber bundles arranged around one upon another, each turn of one of each adjacent spirally-wound bundles being disposed in a plane intersecting the plane in which each turn of the other fiber bundle is disposed, and the outer periphery of the outermost layer of the spirally-wound bundle being held in contact with the inner peripheral surface of said housing.

DESCRIPTION OF THE PREFERRED EMBODIMENTS OF THE INVENTION

Figure 2:
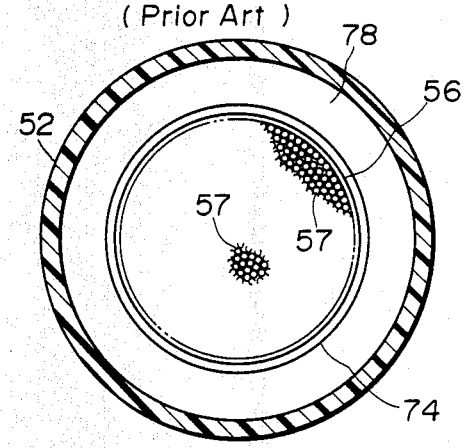
FIG. 2 is a cross-sectional view of the oxygenator taken along the line II—II of FIG. 1.

The invention will now be described with reference to the drawings in which like reference numerals denote corresponding parts in several views.

Figures 3, 4:
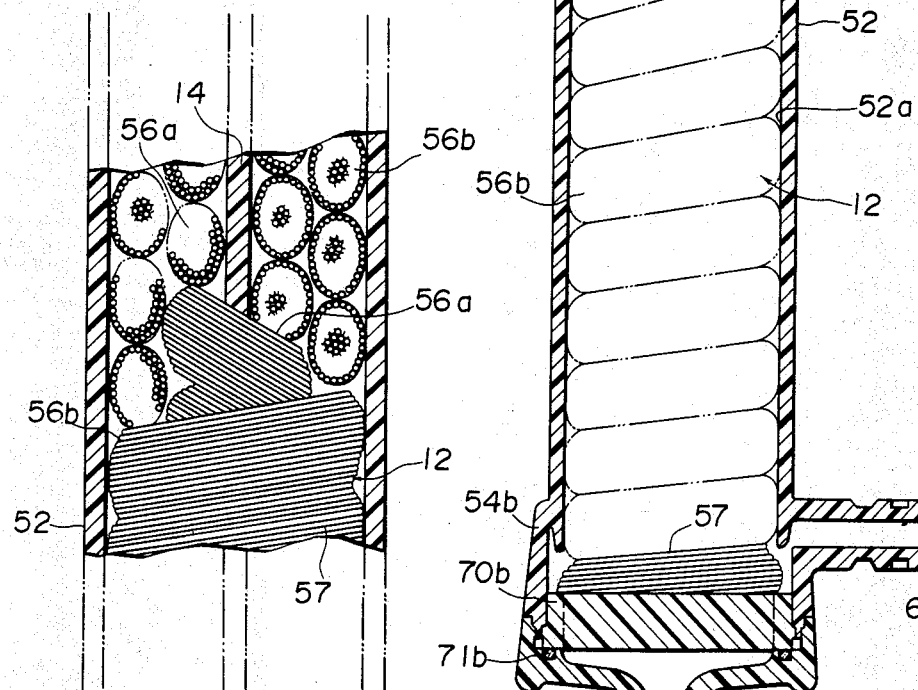
FIG. 3 is a cross-sectional view of a blood oxygenator provided in accordance with the present invention.
FIG. 4 is a fragmentary cross-sectional view of the oxygenator of FIG. 3.

An artificial lung or oxygenator 10 shown in FIGS. 3 and 4 comprises a tubular housing 52 of which inner peripheral surface defines a chamber 52a, and an elongated hollow fiber means or assembly 12 disposed within the housing chamber 52a along an axis thereof. The tubular housing 52 has upper and lower end portions 54a and 54b of an enlarged diameter. The upper end portion 54a has a blood inlet 58 for introducing blood into the housing 52 while the lower end portion 54b has a blood outlet 60 for discharging the blood from the housing 52. A pair of end caps or closure members 62 and 64 are attached to the upper and lower ends of the housing 52, respectively, the end cap 62 having a gas inlet 66 for introducing oxygenating gas into the housing 52 while the other end cap 64 has a gas outlet 68 for discharging the gas from the housing 52. Thus, the end caps 62 and 64 serve as gas inlet and outlet means. The opposite ends of the hollow fiber assembly 12 are secured to the upper and lower end portions 54a and 54b, respectively, by fastening elements 70a and 70b of a potting resin such as a polyurethane resin and a silicone resin. A pair of seal rings 71a and 71b are carried by the caps 62 and 64, respectively, and are held in sealing engagement with the fastening elements 70a and 70b, respectively.

The hollow fiber assembly 12 comprises a core rod 14 of a circular cross-section (FIG. 4), and two layers of spirally-wound bundles 56a and 56b of hollow fibers 57 of microporous membrane arranged around the core rod 14, the inner bundle 56a being wound directly around the core rod 14 while the outer bundle 56b is wound around the inner bundle 56. Each turn of the inner spiral bundle 56a is disposed in a plane intersecting the plane in which each turn of the outer spiral bundle 56b is disposed. Each turn of each spiral bundle 56a, 56b is inclined at an angle, for example, of 30 degrees with respect to a plane perpendicular to the core rod 14 but may be inclined at an angle of 5 to 75 degrees. Thus, in the case where the fiber assembly 12 has more than two fiber bundles, the turns of each adjacent bundles are disposed in an intersecting manner. The opposite ends of the hollow fibers 57 of the bundles 56a and 56b are open to the interiors of the caps 62 and 64, respectively. The outer fiber bundle 56a has a corrugated outer peripheral surface since it is spirally wound. The outer diameter of the outer spiral bundle 56a is substantially equal to or larger than the inner diameter of the tubular housing 52 between the blood inlet and outlets 58 and 60, so that the corrugated outer peripheral surface of the outer bundle 56a is held in sealing contact with the inner peripheral surface of the tubular housing 52. Each of the inner and outer fiber bundles 56a and 56b is composed, for example, of 24 hollow fibers to effect a sealing contact thereof with the tubular housing 52 but may be composed of 2 to 300 hollow fibers. Preferably, each bundle is composed of 10 to 100 hollow fibers.

A degassing fitting or port member 18 is formed integrally with the upper end portion 54a of the tubular housing 52 in diametrically opposite relation to the blood inlet 58 and extends outwardly from the outer peripheral surface thereof. The fitting 18 communicates with the housing chamber 52a at a point intermediate the fastening element 70a and the blood inlet 58 for degassing the blood introduced into the housing chamber 52a via the blood inlet 58. A three-way valve 20 is contained in the fitting 18 for selectively opening and closing the fitting 18.

For assembling the oxygenator 10, the spiral fiber bundles 56a and 56b are arranged around the core rod 14 as described above to form a spiral fiber structure. Then, this spiral fiber structure is inserted into the tubular housing 52. Then, the opposite end portions of the fiber bundles 56a and 56b are sealingly secured to the inner peripheral surface of the tubular housing 52 by a potting resin which constitutes the fastening elements 70a and 70b. Then, after the fastening elements 70a and 70b of the potting resin are cured, the outer portions of the fastening elements 70a and 70b are cut away together with the opposite ends of the fiber bundles 56a and 56b. Then, the pair of end caps 62 and 64 are attached to the upper and lower end portions 54a and 54b of the tubular housing 52.

In an alternative embodiment, the core rod 14 is removed from the spiral fiber structure after it is inserted into the tubular housing 52. Thus, the fiber assembly in this embodiment has no core rod. This facilitates the potting operation and the cutting of the cured potting material.

In operation, an oxygenating gas is introduced into the end cap 62 via the gas inlet port 66 and caused to pass through the internal bores of the hollow fibers 57 of the inner and outer spirally-wound bundles 56a and 56b, the gas being discharged from the end cap 64 via the gas outlet 68. And, blood is introduced into the housing chamber 52a via the blood inlet 58 and is caused to pass through spaces between the hollow fibers 57 of the inner and outer bundles 56a and 56b and discharged from the blood outlet 60. At this time, the oxygen in the oxygenating gas flowing through the hollow fibers diffuses through the porous walls thereof and is brought into contact with the blood to oxygenate it while carbon dioxide in the blood passes through the walls of the hollow fibers thereinto. As described above, the outer periphery of the hollow fiber assembly 12 is held in contact with the inner peripheral surface of the tubular housing 52, the blood does not flow freely along the inner peripheral surface of the tubular housing 52. Therefore, the oxygen in the oxygenating gas is sufficiently brought into contact with the blood passing through the housing chamber 52a to oxygenate it efficiently.

As described above, since the inner and outer fiber bundles 56a and 56b are disposed in an intersecting manner, they cooperate with each other to hold them in place. As a result, the spaces between the inner and outer bundles 56a and 56b are maintained constant, and the blood is filled in these spaces, so that the hollow fiber assembly 12 will not unduly be deformed radially inwardly when a force tending to deform it radially inwardly is encountered upon application of the blood into the housing chamber 52a. Gas or air contained in the blood introduced into the tubular housing 52 collects in an annular space 22 and is discharged through the degassing fitting 18.

As described above, each turn of each spiral bundle 56a, and 56b is inclined at an angle of 5 to 75 degrees with respect to the plane perpendicular to the core rod 14. If the angle exceeds 75 degrees, it is difficult to spirally wind the bundles 56a and 56b. On the other hand, if the angle is less than 5 degrees, the length of each hollow fiber 57 is too long, and the spaces between the inner and outer fiber bundles 56a and 56b becomes smaller, and the blood does not efficiently intrude between the hollow fibers 57 of each bundle.

Figure 1:
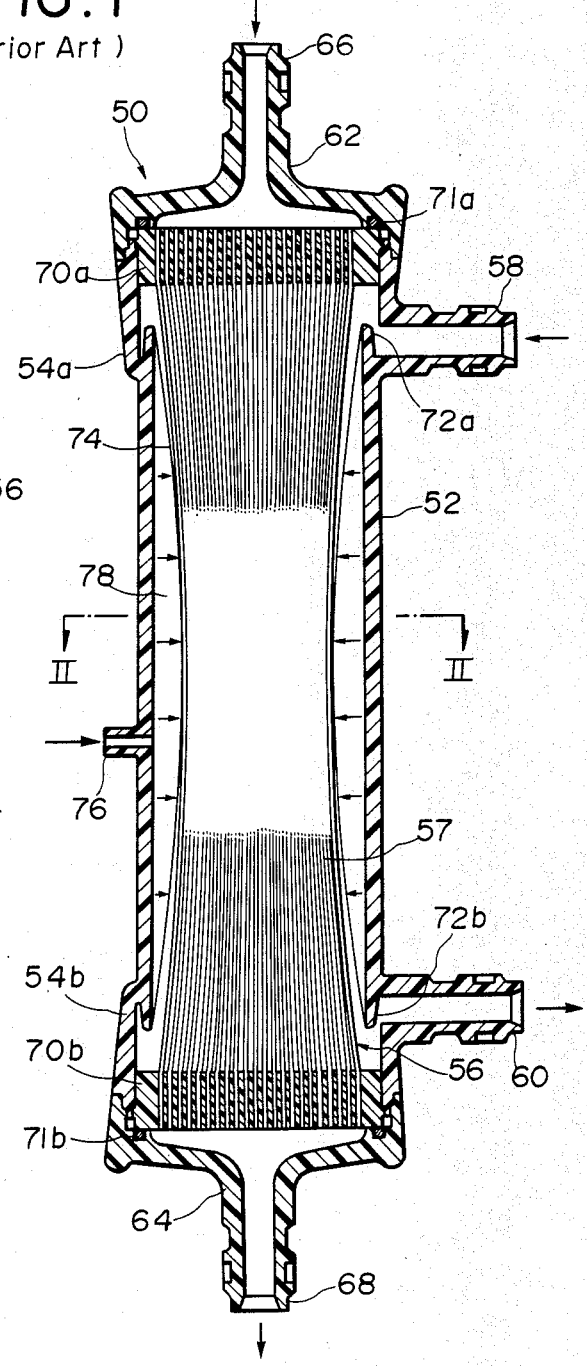
FIG. 1 is a cross-sectional view of a blood oxygenator provided in accordance with the prior art.
Figure 5:
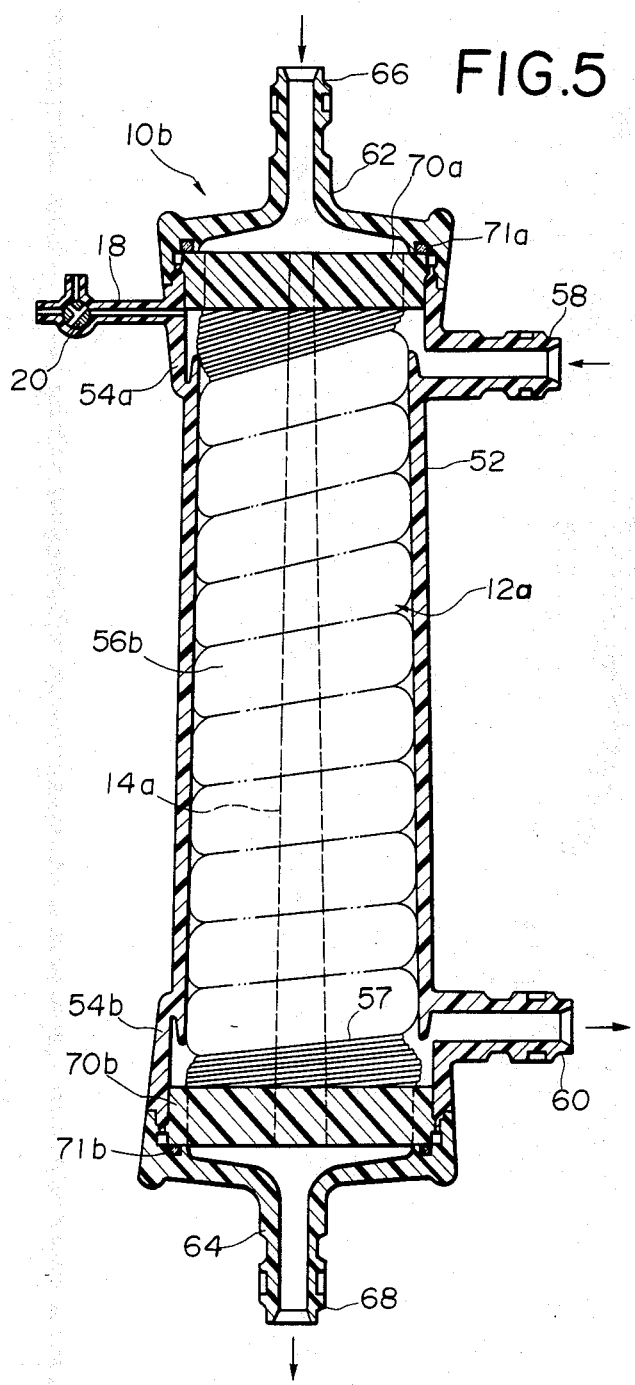
FIG. 5 is a view similar to FIG. 3 but showing a modified oxygenator.

FIG. 5 shows a modified oxygenator 10a which differs from the oxygenator 10 of FIG. 1 in that a tapered core rod 14a replaces the core rod 14, the core rod 14a being decreasing in diameter toward its upper end. Inner and outer spirally-wound fiber bundles 56a and 56b are also tapered toward their upper ends because of the provision of the tapered core rod 14a. Also, a tubular housing 52 is also tapered toward its upper end. With this construction, when assembling the oxygenator 10b, the hollow fiber assembly 12a can be easily inserted into the tubular housing 52 from the lower end thereof without an undue frictional resistance. This eliminates the possibility of damage to the outer periphery of the hollow fiber assembly 12a.

Figure 6:
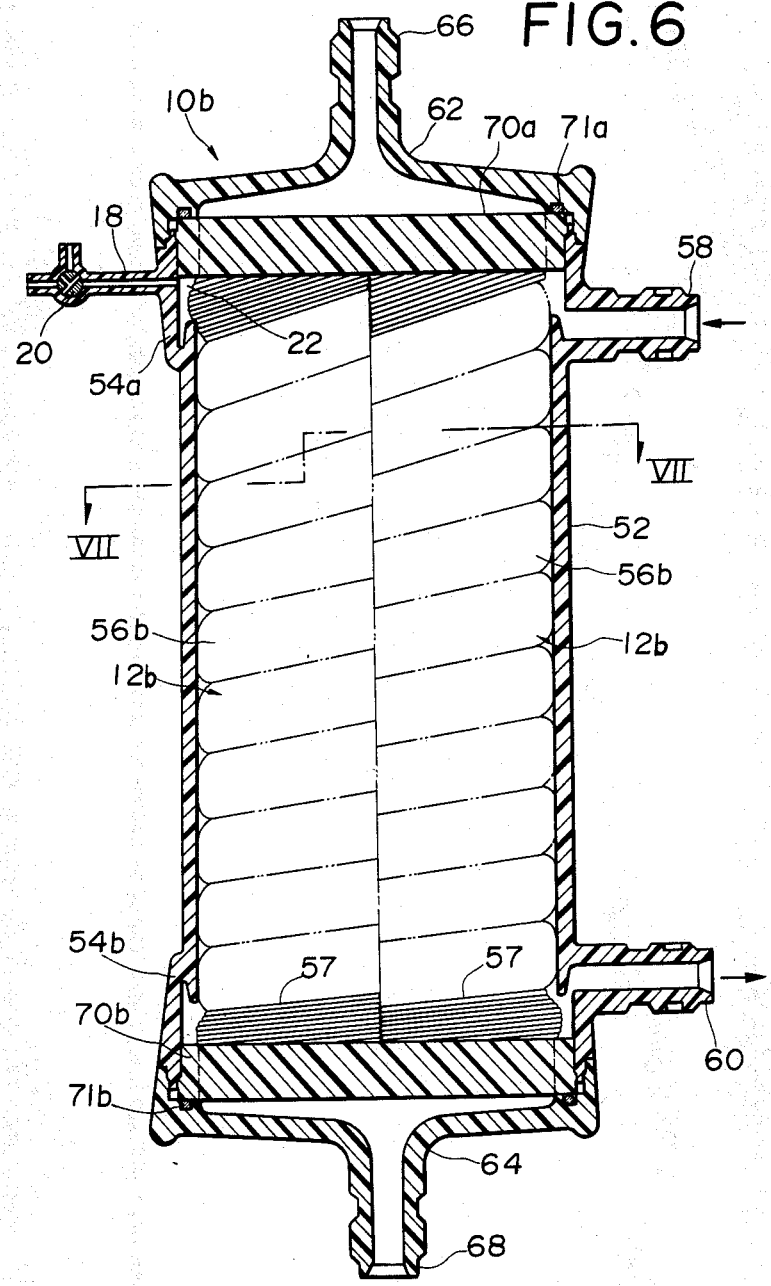
FIG. 6 is a view similar to FIG. 3 but showing another modified oxygenator.
Figure 7:
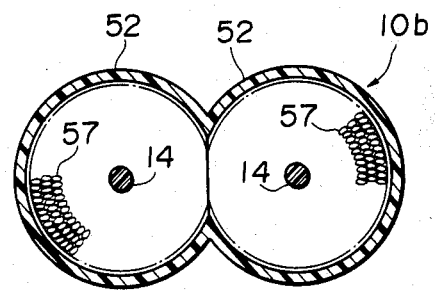
FIG. 7 is a cross-sectional viewe taken along the line VII—VII of FIG. 6.

FIGS. 6 and 7 show another modified oxygenator 10b which differs from the oxygenator 10 of FIG. 3 in that there are provided a pair of parallel-disposed hollow fiber assemblies 12b and 12b each similar in construction to the hollow fiber assembly 12 of FIG. 3. The pair of hollow fiber assemblies 12b and 12b are held in contact with each other at their outer peripheral surfaces and slightly compressed radially inwardly at their contact portions as best shown in FIG. 7.

Figure 9:
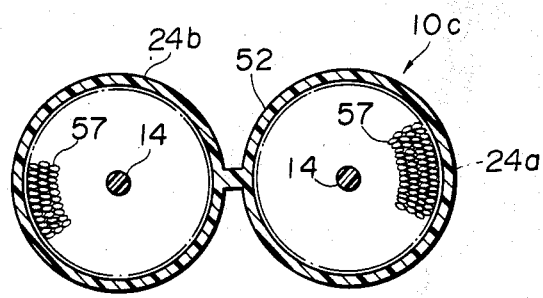
FIG. 9 is a cross-sectional view taken along the line IX—IX of FIG. 8.
Figure 8:
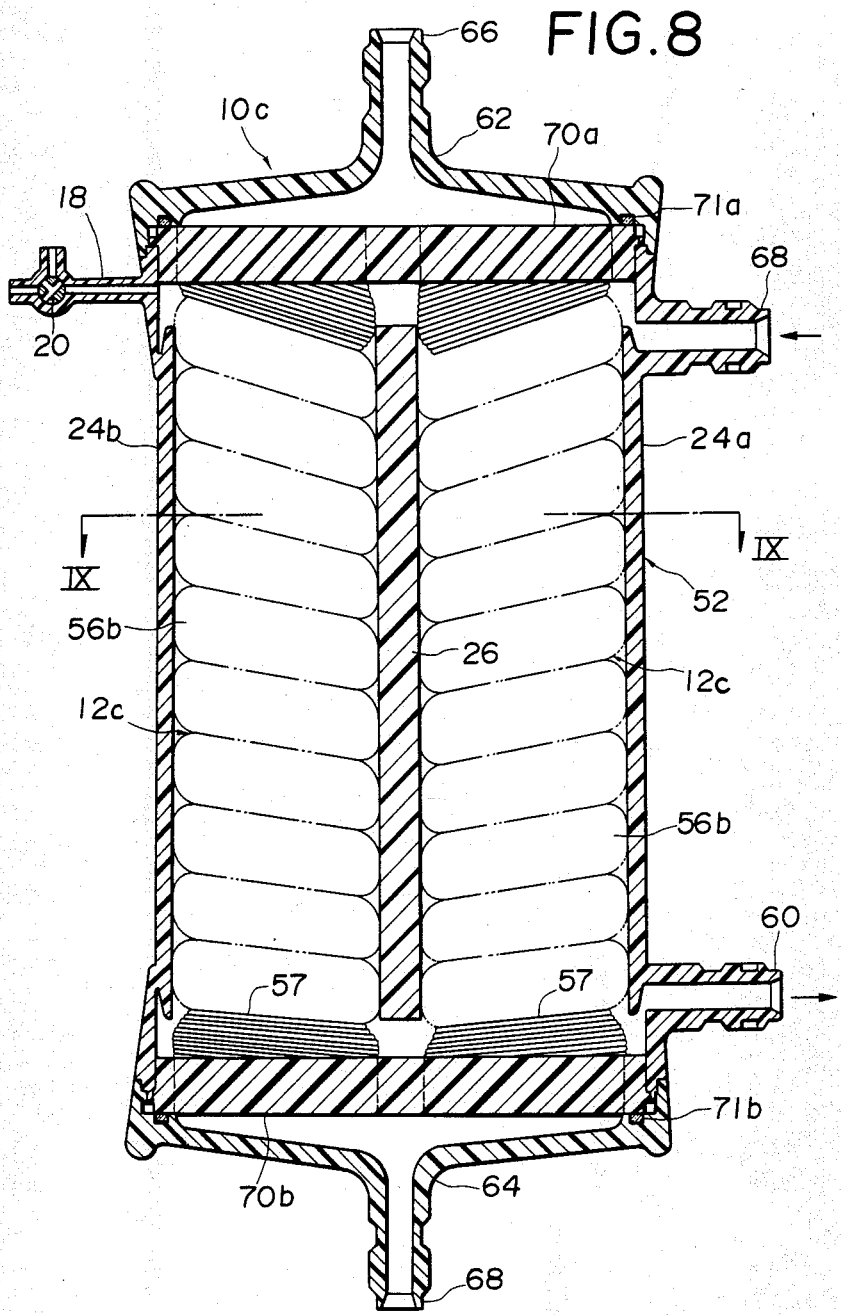
FIG. 8 is a view similar to FIG. 3 but showing a further modified oxygenator.

FIGS. 8 and 9 show a further modified oxygenator 10c which is of the dual type comprising a pair of hollow fiber assemblies 12c and 12c each similar in construction to the hollow fiber assembly 12 of FIG. 3. A tubular housing 52 has a pair of parallel tubular portions 24a and 24b interconnected by a connecting web 26. The pair of hollow fiber assemblies 12c and 12c are disposed in the tubular portions 24a and 24b, respectively, in the manner as described above for the embodiment of FIG. 3. The connecting web 26 terminates short of the upper and lower fastening elements 70a and 70b at opposite ends thereof, so that the two tubular portions 24a and 24b communicate with each other at their opposite ends. By virtue of the provision of the pair of tubular portions 24a and 24b, the housing 52 has an increased strength and will not expand when the blood is introduced thereinto.

The oxygenators 10b of FIG. 6 and FIG. 8 can treat a larger amount of blood per unit time.

What is claimed is:

1. In a blood oxygenator comprising an elongated hollow housing having an inner peripheral surface defining an elongated chamber; at least one elongated fiber assembly disposed within said chamber along an axis thereof and comprising at least one fiber bundle including a plurality of individual hollow fibers of a microporous membrane, opposite ends of said fiber bundle being sealingly secured to the inner peripheral surface of said housing by a potting material; gas inlet and outlet means connected respectively to opposite ends of said housing and communicating respectively with opposite ends of said hollow fibers so that an oxygenating gas can flow from said gas inlet means to said gas outlet means through the interiors of said hollow fibers; and blood inlet and outlet means formed on said housing at axially spaced-apart locations and communicating with said chamber intermediate the opposite ends of said hollow fibers so that blood can flow from said blood inlet means to said blood outlet means axially through said chamber; the improvement wherein each hollow fiber is composed of a microporous membrane which is only gas-permeable, the fiber assembly comprises at least two layers arranged one upon another, each layer comprising at least one spirally-wound fiber bundle having an ellipsoidal cross section, the direction of spiral winding of the fiber bundles in adjacent layers being such that they criss-cross each other, the size of the fibers being such that first hollow spaces are formed along the fibers between adjacent fibers composing the bundle, the size of the bundles being such that second hollow spaces are formed along the fiber bundles between adjacent windings of the fiber bundles and third hollow spaces are formed along the outermost fiber bundle between said outermost bundle and said inner peripheral surface of said elongated hollow housing, the outermost bundle making sealing contact with the inner peripheral surface so as to prevent direct flow of blood along said inner peripheral surface, the second and the third hollow spaces enabling the blood supplied to said elongated chamber to flow therethrough and to be delivered to each of the first hollow spaces formed between the fibers.

2. A blood oxygenator according to claim 1, in which said at least one fiber assembly comprises a core rod around which said at least one spirally-wound bundle is arranged.

3. A blood oxygenator according to claim 1, in which said core rod is tapered from one end thereof toward the other end, so that said at least two layers of spirally-wound fiber bundles are also correspondingly tapered from corresponding one ends toward corresponding other ends.

4. A blood oxygenator according to claim 1, 2 or 3 wherein the fibers composing said at least one fiber bundle are stranded together so that blood flowing through said second and said third hollow spaces is effectively delivered to each of said first hollow spaces formed between the plurality of fibers.

5. A blood oxygenator according to claim 1, which comprises a pair of said fiber assemblies disposed in parallel, the spirally-wound fiber bundles of the pair of fiber assemblies being held in contact with each other at outer peripheral surfaces thereof.

6. A blood oxygenator according to claim 1, which comprises a pair of said fiber assemblies disposed in parallel, said housing having a pair of parallel tubular portions interconnected by a connecting web, the pair of fiber assemblies being disposed in respective ones of the pair of tubular portions.

7. A blood oxygenator according to claim 1, in which said housing has a degassing port means communicating with said chamber, said degassing port means degassing blood introduced into said chamber, a three-way valve means being connected to said degassing port means for selectively opening and closing said degassing port means.

8. A blood oxygenator according to claim 1, in which each turn of said at least one spirally-wound bundle is inclined at an angle of 5 to 75 degrees with respect to a plane perpendicular to the core rod.

9. A blood oxygenator according to claim 1, in which each of said at least one spirally-wound fiber bundles comprises 2 to 300 hollow fibers.

10. A blood oxygenator for oxygenating an axial flow of blood, comprising an elongated hollow housing having an inner peripheral surface defining an elongated chamber;

inner and outer fiber bundles each comprising a plurality of individual hollow fibers of a microporous membrane which is only gas-permeable, each of said plurality of hollow fibers being of such a size that first hollow spaces are formed along the fibers of a bundle, said inner and outer fiber bundles being spirally-wound such that each spiral turn of a bundle is in contact with an adjacent turn of the bundle and being of such a size that each spiral turn of a bundle creates a corrugated outer peripheral surface, said outer fiber bundle being arranged upon the inner fiber bundle, the corrugated outer peripheral surfaces of said inner and outer fiber bundles creating second hollow spaces therebetween which accommodate the flow of blood axially through said housing between said inner and outer bundles, each turn of the inner fiber bundle being disposed in a plane intersecting the plane in which each turn of the outer fiber bundle is disposed so that the inner and outer bundles criss-cross each other, the inner and outer fiber bundles being of such a size that the chamber is completely filled and the outer fiber bundle is held in sealing contact with the inner peripheral surface of said housing, the corrugated outer peripheral surface of said outer bundle and the inner peripheral surface of the elongated hollow housing creating third hollow spaces therebetween, the second and third hollow spaces enabling blood supplied to said elongated chamber to flow therethrough and to be delivered to each of the first hollow spaces;

a potting material sealingly securing opposite ends of said fiber bundles to the inner peripheral surface of said housing;

blood inlet and outlet means formed on said housing at axially spaced-apart locations and communicating with said chamber intermediate the opposite ends of said fiber bundles so that blood can flow from said blood inlet means to said blood outlet means axially through the second hollow spaces between said fiber bundles in said chamber; and gas inlet and outlet means connected respectively to opposite ends of said housing and communicating respectively with opposite ends of said hollow fibers so that an oxygenating gas can flow from said gas inlet means to said gas outlet means through the interior of said hollow fibers.

* * * * *